(12) United States Patent
Ormieres et al.

(10) Patent No.: US 11,738,882 B2
(45) Date of Patent: Aug. 29, 2023

(54) ANTI-SURGE REGULATION FOR A CHARGING COMPRESSOR WITH WHICH AN AUXILIARY POWER UNIT IS EQUIPPED

(71) Applicant: SAFRAN POWER UNITS, Toulouse (FR)

(72) Inventors: David Francis Pierre Ormieres, Moissy-Cramayel (FR); Louis Jean-Paul Fabien Perrot-Minot, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 0 days.

(21) Appl. No.: 17/632,460

(22) PCT Filed: Jul. 31, 2020

(86) PCT No.: PCT/FR2020/051421
§ 371 (c)(1),
(2) Date: Feb. 2, 2022

(87) PCT Pub. No.: WO2021/023937
PCT Pub. Date: Feb. 11, 2021

(65) Prior Publication Data
US 2022/0274716 A1 Sep. 1, 2022

(30) Foreign Application Priority Data
Aug. 7, 2019 (FR) .................................... 1909051

(51) Int. Cl.
*B64D 41/00* (2006.01)
*F04D 27/00* (2006.01)
(Continued)

(52) U.S. Cl.
CPC ............ *B64D 41/00* (2013.01); *F04D 27/001* (2013.01); *B64D 2033/0213* (2013.01); *F04D 27/0223* (2013.01)

(58) Field of Classification Search
CPC ............ B64D 2033/0213; B64D 41/00; F04D 27/001; F04D 27/0223; Y02T 50/50
See application file for complete search history.

(56) References Cited

U.S. PATENT DOCUMENTS 2,409,837 A    10/1946  Alford
4,405,290 A *  9/1983  Rannenberg .......... F04D 29/462
                                               417/282

(Continued)

OTHER PUBLICATIONS

International Search Report dated Jan. 29, 2021 in PCT/FR2020/051421 filed on Jul. 31, 2020 (2 pages).

(Continued)

*Primary Examiner* — Jesse S Bogue
(74) *Attorney, Agent, or Firm* — Oblon, McClelland, Maier & Neustadt, L.L.P.

(57) ABSTRACT

An aircraft auxiliary power unit is equipped with a charging compressor. A method determines a surge parameter indicative of a risk that the charging compressor will display the phenomenon known as surge. A method and a system control a relief valve of this charging compressor. The method for determining the surge parameter includes calculating this surge parameter Ppomp as being the sum of a first term T1 and of a second term T2, the first term T1 being calculated on the basis of a first pressure P1 measured downstream of a diffuser of the charging compressor, and of a second pressure P2 measured upstream of the diffuser, the second term T2 being calculated on the basis of a third pressure P3 measured upstream of the diffuser and of an ambient pressure Psamb indicative of a pressure of an ambient environment.

9 Claims, 2 Drawing Sheets

(51) Int. Cl.
  *B64D 33/02* (2006.01)
  *F04D 27/02* (2006.01)

(56) References Cited

U.S. PATENT DOCUMENTS

| | | | | |
|---|---|---|---|---|
| 5,095,714 A | * | 3/1992 | Adachi | F25B 49/022 |
| | | | | 415/48 |
| 5,306,116 A | * | 4/1994 | Gunn | F04D 27/0207 |
| | | | | 415/17 |
| 5,683,223 A | * | 11/1997 | Harada | F04D 29/462 |
| | | | | 415/17 |
| 2007/0248453 A1 | | 10/2007 | Tetu et al. | |

OTHER PUBLICATIONS

Preliminary French Search Report dated Mar. 27, 2020 in FR1909051 filed on Aug. 7, 2019 (7 pages, with Translation of Categories).

\* cited by examiner

ANTI-SURGE REGULATION FOR A CHARGING COMPRESSOR WITH WHICH AN AUXILIARY POWER UNIT IS EQUIPPED

TECHNICAL FIELD

The invention relates to the field of regulating a charging compressor with which an auxiliary power unit of an aircraft is equipped. It is intended to prevent the phenomenon of surge within the compressor, in particular in the event of closure of the valve controlling the air supply to the aircraft's environmental control system. The invention relates to a method for determining a surge parameter indicative of the risk of the surge phenomenon arising in a charging compressor of an auxiliary power unit, and to a method and system for controlling a relief valve for this charging compressor.

PRIOR ART

An aircraft is typically equipped with main engines and an auxiliary power unit. The main engines are dedicated to propulsion and, at cruising speed, to the production of energy for the various on-board equipment. The auxiliary power unit (APU) is a device for supplying different types of energy (electrical, hydraulic, pneumatic, mechanical energy) to power on-board equipment, in particular when the main engines are not running. An auxiliary power unit typically comprises a turboshaft engine and a charging compressor mechanically driven by the turboshaft engine to supply compressed air to an aircraft's environmental control system. This environmental control system (ECS) comprises an adjustable valve referred to as the "aircraft valve" or "ECS valve" to control the flow of compressed air from the charging compressor. The ECS valve can be completely closed when the environmental control system is being powered by the main engines. In situations where there is relatively little or no demand for compressed air, the charging compressor may be subject to a surge phenomenon, which can cause damage thereto. To limit this risk, the air flow rate at the inlet of the charging compressor can be regulated by inlet guide vanes (IGVs). In situations where demand for compressed air is low, in particular when the ECS valve is completely closed, the IGVs can also be positioned in a semi-closed or closed position. However, the response time of the IGVs is relatively slow compared to that of the ECS valve, such that the surge phenomenon can still occur in a transient manner. Moreover, the IGVs do not typically completely stop the flow of air into the charging compressor. As a result, the surge phenomenon remains if the ECS valve is completely closed.

Charging compressor surge can be prevented by equipping the auxiliary power unit with a relief valve disposed downstream of the charging compressor and controlled as a function of the surge phenomenon or as a function of the risk thereof. The relief valve can be naturally switched to the open position as soon as the ECS valve is closed. However, when the ECS valve is only partially closed, it is difficult to identify the situations in which the surge phenomenon may occur. There is thus a need to identify these situations in a reliable manner.

A first solution to identify a surge risk involves determining the parameters of the fluid upstream and downstream of the charging compressor, in particular the total pressure, temperature and flow rate thereof. This solution is perfectly reliable in theory, but has the drawback of relying on the use of numerous sensors. These sensors are expensive and prone to malfunction, making the solution unreliable in practice. Moreover, flow sensors are difficult to integrate into the charging compressor.

A second solution to identify a risk of charging compressor surge comprises determining a surge parameter $P_{surge}$ defined by the ratio between a total pressure $Pt_{1300}$ at the outlet of the charging compressor and a static pressure $Ps_{1270i}$ upstream of the diffuser of the charging compressor, according to the relationship:

$$P_{surge} = \frac{Pt_{1300} - Ps_{1270i}}{Pt_{1300}}$$

However, the relationship between this surge parameter $P_{surge}$ and the flow rate at the outlet of the charging compressor is not bijective. For the same surge criterion, two flow rate values can be obtained. The determination of the flow rate at the outlet of the charging compressor requires additional parameters to be determined. In particular, the degree of opening of the IGVs and a B-parameter calculated from the static pressure $Ps_{1270i}$, the ambient static pressure $Ps_{amb}$, the ambient temperature $T_{amb}$ and the temperature $T_{1300}$ at the outlet of the charging compressor can be used:

$$B = \frac{Ps_{1270i}}{Ps_{amb}} \cdot \frac{T_{amb}}{T_{1300} - T_{amb}}$$

The calculation of the B-parameter thus involves measuring an additional pressure $Ps_{amb}$ and two temperatures $T_{amb}$ and $T_{1300}$. The second solution thus suffers from the same drawbacks as the first solution.

In light of the above, the purpose of the invention is to provide a solution for reliably and cost-effectively identifying a risk of the surge phenomenon arising in a charging compressor with which an auxiliary power unit of an aircraft is equipped. In particular, the invention aims to limit the number of parameters to be measured in order to determine this surge risk. The invention further aims to establish a bijective relationship between a surge parameter quantifying the surge risk and a flow rate at the outlet of the charging compressor. Another purpose of the invention is to provide a method and a device whose design, manufacturing and maintenance costs are compatible with use on an industrial scale.

DESCRIPTION OF THE INVENTION

To this end, the invention is based on wisely selecting the parameters to be measured, allowing a surge parameter to be determined through a relationship that limits the number of these parameters. The selected parameters further allow a bijective relationship to be established between the surge parameter and the flow rate of the charging compressor.

More specifically, the invention relates to a method for determining a surge parameter $P_{surge}$ indicative of a risk of the surge phenomenon arising in a charging compressor with which an auxiliary power unit for an aircraft is equipped. The charging compressor comprises a diffuser and a casing disposed downstream of the diffuser. The method according to the invention comprises calculating the surge parameter $P_{surge}$ as being the sum of a first term $T_1$ and of a second term $T_2$. The first term $T_1$ is calculated from a first pressure $P_1$ measured downstream of the diffuser and a second pressure $P_2$ measured upstream of the diffuser; the second term $T_2$ is calculated from a third pressure $P_3$ measured upstream of the diffuser and from an ambient pressure $Ps_{amb}$ indicative of a pressure of the ambient environment surrounding the auxiliary power unit (APU).

The surge parameter $P_{surge}$ is thus calculated from four pressures, or three pressures when the pressures $P_2$ and $P_3$ are identical. No temperature or flow measurements are required.

The charging compressor can in particular be a centrifugal compressor. The diffuser is thus a radial-vaned diffuser.

The first pressure $P_1$ is, for example, a total pressure $Pt_{1300}$ upstream of the casing, a total pressure $Pt_{1800}$ downstream of the casing, a static pressure $Ps_{1300}$ upstream of the casing or a static pressure $Ps_{1800}$ downstream of the casing. The total pressure $Pt_{1300}$ and static pressure $Ps_{1300}$ are thus measured at the interface between the diffuser and the casing. The positioning of the pressure sensor, upstream or downstream of the casing, is chosen as a function of the slope of the curve indicative of the first term $T_1$, and as a function of the possibilities of integrating this sensor in the charging compressor.

The second pressure $P_2$ and/or the third pressure $P_3$ is, for example, a static pressure upstream of the diffuser. Preferably, the pressure $P_3$ is a static pressure $Ps_{1270i}$ measured at the leading edge inter-blade region of the diffuser. In other words, the static pressure $Ps_{1270i}$ is a static pressure measured between blades of the diffuser at the leading edge thereof. Advantageously, the pressure $P_3$ is determined as being an average of the pressures measured between the different pairs of blades of the diffuser at the leading edge thereof.

The ambient pressure $Ps_{amb}$ is, for example, a static pressure of the ambient environment of the auxiliary power unit.

According to a first embodiment, the first term $T_1$ is calculated using the following equation:

$$T_1 = \frac{P_1 - P_2}{P_1}$$

The first term $T_1$ can in particular be calculated using the following equation:

$$T_1 = \frac{Pt_{1300} - Ps_{1270i}}{Pt_{1300}}$$

According to a second embodiment, the second term $T_2$ is calculated using the following equation:

$$T_2 = \frac{1}{1 + \exp(10 \cdot (P_3 - Ps_{amb}))}$$

In particular, when the pressure $P_3$ is the static pressure $Ps_{1270i}$, the second term $T_2$ becomes:

$$T_2 = \frac{1}{1 + \exp(10 \cdot (Ps_{1270i} - Ps_{amb}))}$$

The first and second embodiments are compatible and give the following relationship for determining the surge parameter $P_{surge}$:

$$P_{surge} = \frac{Pt_{1300} - Ps_{1270i}}{Pt_{1300}} + \frac{1}{1 + \exp(10 \cdot (Ps_{1270i} - Ps_{amb}))}$$

The invention further relates to a method for controlling a relief valve for a charging compressor with which an auxiliary power unit for an aircraft is equipped, the charging compressor comprising a diffuser and a casing disposed downstream of the diffuser, the relief valve being disposed downstream of the casing. According to the invention, the control method comprises:

determining the surge parameter $P_{surge}$ in accordance with the determination method as described hereinabove, comparing the surge parameter $P_{surge}$ determined by the determination method with a predetermined pressure relief threshold and opening the relief valve when the surge parameter $P_{surge}$ is below the pressure relief threshold or when the surge parameter $P_{surge}$ is above the pressure relief threshold.

When the surge parameter $P_{surge}$ is defined by the first and second embodiments, the relief valve is opened when the surge parameter $P_{surge}$ is above the pressure relief threshold.

The invention further relates to a device for controlling a relief valve for a charging compressor with which an auxiliary power unit for an aircraft is equipped, the charging compressor comprising a diffuser and a casing disposed downstream of the diffuser, the relief valve being disposed downstream of the casing. According to the invention, the control device comprises a processing unit arranged to determine the surge parameter $P_{surge}$ in accordance with the determination method described hereinabove, to compare said surge parameter $P_{surge}$ with a predetermined pressure relief threshold and to trigger the opening of the relief valve when the surge parameter $P_{surge}$ is below the pressure relief threshold or when the surge parameter $P_{surge}$ is above the pressure relief threshold.

Finally, the invention relates to an auxiliary power unit for an aircraft, the auxiliary power unit comprising a charging compressor, a relief valve and a relief valve control device as described hereinabove. The charging compressor comprises a diffuser and a casing disposed downstream of the diffuser, and the relief valve is disposed downstream of the casing.

BRIEF DESCRIPTION OF THE FIGURES

Other features, details and advantages of the invention will appear after reading the following description, which is provided for illustration purposes only, given with reference to the accompanying drawings, for which.

DETAILED DESCRIPTION

Figure 1:
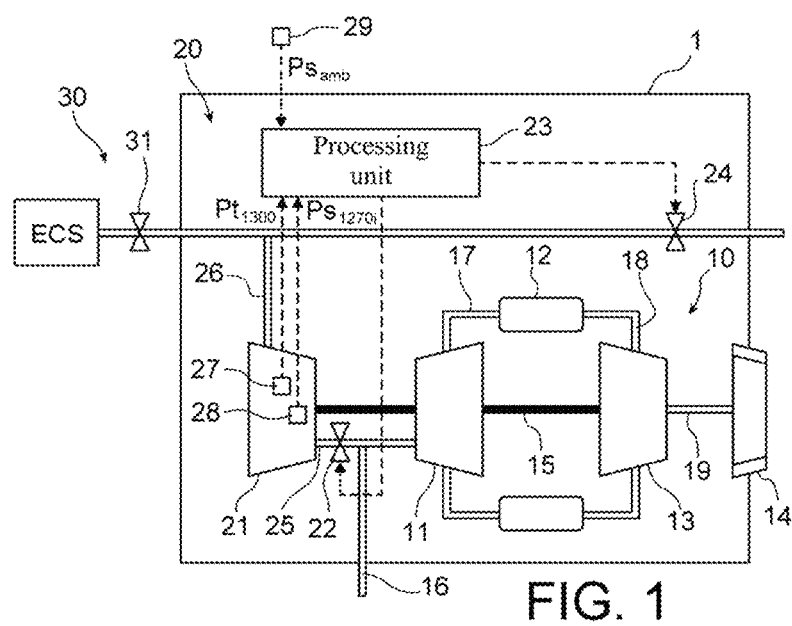
FIG. 1 shows an example of an auxiliary power unit comprising a relief valve for a charging compressor and a processing unit arranged to control the relief valve in accordance with the control method according to the invention.

FIG. 1 diagrammatically shows an example of an auxiliary power unit 1 with which an aircraft can be equipped. The auxiliary power unit 1 (APU) comprises a gas generator 10 and a compressed air supply system 20. The gas generator 10 includes a main compressor 11, a combustion chamber 12, a turbine 13, a nozzle 14, a power shaft 15, an air supply line 16, a compressed air line 17, a flue gas line 18 and an exhaust line 19. The main compressor 11 is supplied with air via the air supply line 16 and supplies compressed air to the combustion chamber 12 via the compressed air line 17. The compressed air is mixed with fuel in the combustion chamber 12. The combustion of this mixture generates high-energy gases which are conveyed into the turbine 13 via the flue gas line 18. The passage of these gases through the turbine 13 causes it to rotate. The power shaft 15 mechanically connects the turbine 13 to the main compressor 11, such that the main compressor 11 is also driven in rotation. After passing through the turbine 13, the exhaust gases are exhausted from the auxiliary power unit 1 through the exhaust line 19 and the nozzle 14.

Figure 2:
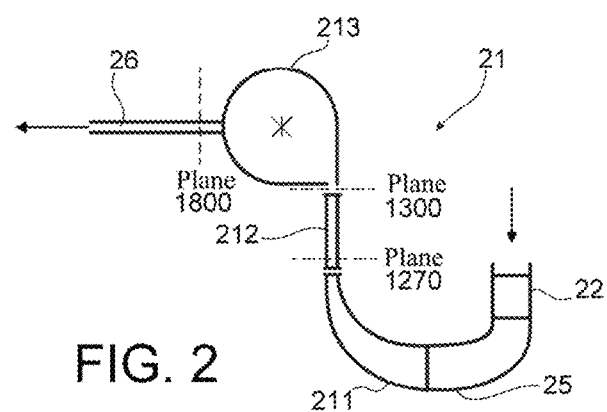
FIG. 2 diagrammatically shows a charging compressor of the auxiliary power unit in FIG. 1.

The compressed air supply system 20 comprises a charging compressor 21, inlet guide vanes 22, a processing unit 23, a relief valve 24, an air intake line 25, an air output line 26, a first pressure sensor 27, a second pressure sensor 28 and a third pressure sensor 29. FIG. 2 diagrammatically shows the charging compressor 21. The charging compressor 21 is a centrifugal compressor. It is supplied with air from the air supply line 16 via the air intake line 25. The inlet guide vanes 22 are positioned on the air intake line 25, so as to regulate the air flow to the inlet of the charging compressor 21 without interfering with the air flow to the main compressor 11. The inlet guide vanes 22 are also referred to as "IGVs". The charging compressor 21 comprises an impeller 211, a diffuser 212 and a casing 213. The impeller 211 is mechanically connected to the power shaft 15 in order to be driven in rotation with the main compressor 11 and the turbine 13. The casing 213 is disposed downstream of the diffuser 212 and connected to an inlet of the air output line 26. The outlet of the air output line 26 is connected to the relief valve 24 and to an environmental control system 30. In the example embodiment shown in FIG. 1, the first pressure sensor 27 measures the total pressure $Pt_{1300}$ at the interface between the diffuser 212 and the casing 213 of the charging compressor 21. The second pressure sensor 28 measures the static pressure $Ps_{1270i}$ upstream of the diffuser 212. The third pressure sensor 29 measures a static pressure $Ps_{amb}$ of the ambient environment of the auxiliary power unit 1. According to other embodiments, the pressure sensors 27, 28, 29 can measure other pressures. In particular, the pressure sensor 27 could measure the static pressure $Ps_{1300}$ at the interface between the diffuser 212 and the casing 213 of the charging compressor 21, or the total pressure $Pt_{1800}$ or static pressure $Ps_{1800}$ downstream of the casing 213. The pressure sensor 29 could measure the total pressure $Pt_{amb}$ of the ambient environment. The processing unit 23 comprises, for example, a processor. It is arranged to receive the measurements from the pressure sensors 27, 28 and 29, to determine a surge parameter $P_{surge}$ from these measurements, and to trigger the opening of the relief valve 24 as a function of this surge parameter $P_{surge}$ and as a function of a predetermined pressure relief threshold $Th_{rel}$, as described hereinbelow. The processing unit 23 can further be arranged to control the inlet guide vanes 22, for example as a function of one or more measurements from the pressure sensors 27, 28, 29, and/or as a function of other measurements.

The environmental control system 30 is arranged to regulate the air pressure inside the aircraft cabin. It in particular comprises a valve 31, referred to as the ECS valve, for regulating the air flow to the environmental control system. In particular, the ECS valve 31 can be in the closed position when compressed air is being supplied to the environmental control system 30 by the main engines.

Figure 3:
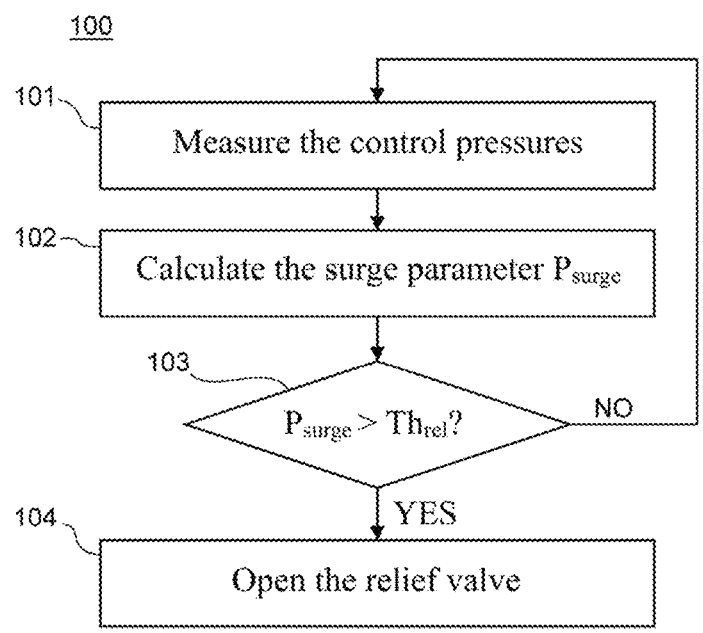
FIG. 3 shows an example method for controlling the relief valve according to the invention.

FIG. 3 shows an example method for controlling the relief valve 24. The control method 100 comprises a step 101 of measuring three control pressures, i.e. the total pressure $Pt_{1300}$ upstream of the casing 213, the static pressure $Ps_{1270i}$ upstream of the diffuser 212 and the static pressure $Ps_{amb}$ of the ambient environment of the auxiliary power unit. In a step 102, the surge parameter $P_{surge}$ is calculated from these control pressures:

$$P_{surge} = \frac{Pt_{1300} - Ps_{1270i}}{Pt_{1300}} + \frac{1}{1 + \exp(10 \cdot (Ps_{1270i} - Ps_{amb}))}$$

The method then comprises a step 103 of comparing this surge parameter $P_{surge}$ with a predetermined pressure relief threshold $Th_{rel}$. This pressure relief threshold $Th_{rel}$ can be constant, regardless of the speed of the gas generator 10 and the opening position of the IGVs. If the surge parameter $P_{surge}$ is below or equal to the pressure relief is threshold $Th_{rel}$ the method 100 is resumed at step 101 of measuring the control pressures in order to perform a monitoring loop. If, on the other hand, the surge parameter calculated in step 102 is above the pressure relief threshold $Th_{rel}$, the method proceeds to step 104 of opening the relief valve 24. During this step 104, the relief valve 24 is opened in order to reduce the pressure at the outlet of the charging compressor 21 and thus prevent the surge phenomenon. The relief valve 24 can be completely or partially opened.

The method for controlling the relief valve according to the invention thus makes it possible to prevent the charging compressor from exhibiting a surge phenomenon by controlling this surge risk using a limited number of measured parameters.

The invention claimed is:

1. A method for determining a surge parameter indicative of a risk of the surge phenomenon arising in a charging compressor with which an auxiliary power unit for an aircraft is equipped, the charging compressor comprising a diffuser and a casing disposed downstream of the diffuser, the method comprising calculating the surge parameter $P_{surge}$ surge as being the sum of a first term $T_1$ and of a second term $T_2$, the first term $T_1$ being calculated from a first pressure $P_1$ measured downstream of the diffuser and a second pressure $P_2$ measured upstream of the diffuser, the second term $T_2$ being calculated from a third pressure $P_3$ measured upstream of the diffuser and from an ambient pressure $Ps_{amb}$ indicative of a pressure of an ambient environment surrounding the auxiliary power unit.

2. The method according to claim 1, wherein the first pressure $P_1$ is a total pressure $PT_{1300}$ upstream of the casing, a total pressure $Pt_{1800}$ downstream of the casing, a static pressure $Ps_{1300}$ upstream of the casing or a static pressure $Ps_{1800}$ downstream of the casing.

3. The method according to claim 1, wherein the second pressure $P_2$ and/or the third pressure $P_3$ is a static pressure $Ps_{1270i}$ upstream of the diffuser measured between blades of the diffuser at the leading edge thereof.

4. The method according to claim 1, wherein the ambient pressure $Ps_{amb}$ is a static pressure of the ambient environment of the auxiliary power unit.

5. The method according to claim 1, wherein the first term $T_1$ is calculated using the following equation:

$$T_1 = \frac{P_1 - P_2}{P_1}.$$

6. The method according to claim 1, wherein the second term $T_2$ is calculated using the following equation:

$$T_2 = \frac{1}{1 + \exp(10 \cdot (P_3 - Ps_{amb}))}.$$

7. The method for controlling a relief valve for a charging compressor with which an auxiliary power unit for an aircraft is equipped, the charging compressor comprising a diffuser and a casing disposed downstream of the diffuser, the relief valve being disposed downstream of the casing, the control method comprising:

calculating the surge parameter $P_{surge}$ in accordance with the determination method according to claim 1, comparing the surge parameter $P_{surge}$ determined by the determination method with a predetermined pressure relief threshold $Th_{rel}$ and opening the relief valve when the surge parameter $P_{surge}$ is below the pressure relief threshold $Th_{rel}$ or when the surge parameter $P_{surge}$ is above the pressure relief threshold $Th_{rel}$.

8. A device for controlling a relief valve for a charging compressor with which an auxiliary power unit for an aircraft is equipped, the charging compressor comprising a diffuser and a casing disposed downstream of the diffuser, the relief valve (24) being disposed downstream of the casing, the control device comprising a processing unit arranged to determine the surge parameter $P_{surge}$ in accordance with the determination method according to claim 1, to compare said surge parameter $P_{surge}$ with a predetermined pressure relief threshold $Th_{rel}$ and to trigger the opening of the relief valve when the surge parameter $P_{surge}$ is below the pressure relief threshold $Th_{rel}$ or when the surge parameter $P_{surge}$ is above the pressure relief threshold $Th_{rel}$.

9. An auxiliary power unit for an aircraft, the auxiliary power unit comprising a charging compressor, a relief valve and a relief valve control device according to claim 8, the charging compressor comprising a diffuser and a casing disposed downstream of the diffuser, and the relief valve being disposed downstream of the casing.

* * * * *